United States Patent Office 3,463,798
Patented Aug. 26, 1969

3,463,798
COMPOUNDS WITH ANTI-HORMONAL ACTIVITY WHICH ARE OF THE 4α,8α,14β-TRIMETHYL-18-NOR-ANDROSTANE SERIES, INCLUDING ESTERS
Wagn Ole Godtfredsen, Vaerlose, and Welf von Daehne, Copenhagen, Denmark, assignors to Løvens Kemiske Fabrik Produktionsaktieselskab, Ballerup, Denmark, a firm of Denmark
No Drawing. Filed Feb. 21, 1967, Ser. No. 617,478
Claims priority, application Great Britain, Feb. 25, 1966, 8,517/66
Int. Cl. C07c *169/22, 169/20, 169/24*
U.S. Cl. 260—397.45                           6 Claims

ABSTRACT OF THE DISCLOSURE

This relates to 4α,8α,14β-trimethyl-3$R_1$-11$R_2$-17$R_3$-5α,9α-or-β,13β-trihydrogen-18 - nor - androstane compounds and their 3, 11 and 17 esters with monocarboxylic and dicarboxylic acids, where $R_1$ is either keto or β-hydroxy and $R_2$ and $R_3$ are either keto or α- or O-hydroxy, together with intermediates.

The end products disclosed, including the esters, have anti-hormonal effects.

---

This invention relates to a group of new compounds of the 4α,8α,14β-trimethyl-18-nor-androstane series having the general formula:

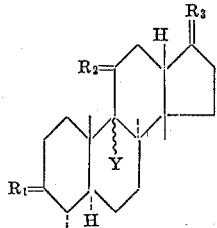

(I)

wherein $R_1$ is a member of the group consisting of an oxygen atom, a

group, and esters of a

group with hydrocarbon monocarboxylic and dicarboxylic acids having up to 8 carbon atoms, $R_2$ and $R_3$ individually are members of the group consisting of an oxygen atom, a

group, a

group, and esters of said

and

groups with hydrocarbon monocarboxylic and dicarboxylic acids having up to 8 carbon atoms, and Y is selected from the group consisting of an α-oriented and a β-oriented hydrogen atom.

The compounds of the present invention possess antihormonal effects, and they are, therefore, intended to be used in the treatment of patients suffering from endocrine diseases for which purpose they may be administered in doses from ¼ mg. to 500 mg., and preferably from ½ mg. to 50 mg. The components can be administered by mouth, topically or parenterally.

The antihormonal effects of the present compounds vary to some extent with the kind of substituents. Thus, the above 3-keto-11,17-dihydroxy derivatives show an antiestrogenic effect, whereas the 3,11,17-triketo derivatives have a strong anti-androgenic effect which is approximately twice that of A-nor-progesterone.

According to the investigations up till now this activity seems particularly to be attached to steroids of the present type in which a β-oriented OH group or a keto group is attached to C–3.

It is in particular advantageous that in contradistinction to the hitherto known sterioids used in the treatment of diseases in which it is desirable to counteract sex hormone-linked pathology the compounds of the invention do not possess any hormonal activity themselves.

To provide the compounds of the invention fusidic acid and derivatives thereof may be used as starting substances, e.g. 24,25-dihydrofusidic acid, 3-dehydro-24,25-dihydrofusidic acid, 11-dehydro-24,25-dihydrofusidic acid and 3,11-didehydro-24,25-dihydrofusidic acid which are known compounds, or corresponding derivatives may be used, e.g. esters of the derivatives aforesaid, the esters being known compounds or they may be produced by simple reactions. Accordingly the starting substances of the method of the invention can be comprised under the following general formula:

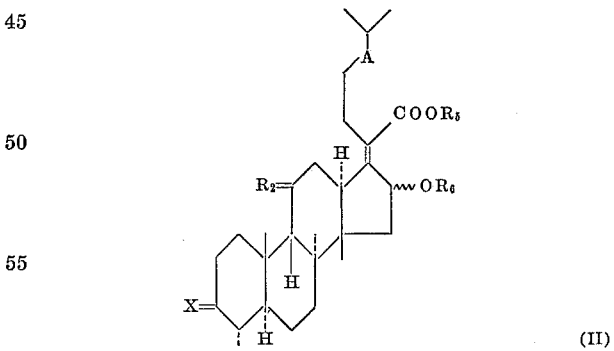

(II)

in which X and $R_2$ individually are members of the group consisting of an oxygen atom, a

group, a

group, and esters of said

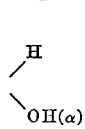

and

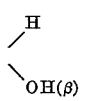

groups with hydrocarbon monocarboxylic and dicarboxylic acids having up to 8 carbon atoms, $R_5$ and $R_6$ individually are members of the group consisting of a hydrogen atom and alkyl groups, and A indicates a single or double bond.

The first step in the preparation of the compounds of the invention consists in a compound of Formula II being exposed to an ozonolysis whereby the side-chain is split off with the formation of a compound of Formula III:

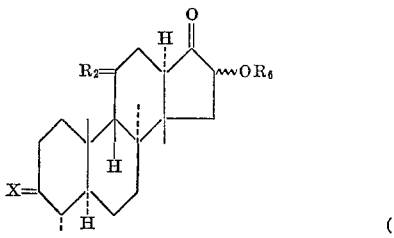

in which X, $R_2$ and $R_6$ have the meaning as stated in connection with Formula II above.

By subsequent treatment of compounds of Formula III with a strong acid (such as hydrogen chloride in acetic acid) HO-acyl is eliminated with the formation of a double bond between C–12 and C–13. If $R_2$ in Formula III is an oxygen atom the elimination can also take place under basic conditions, e.g. by treatment with ethanolic sodium hydroxide. By this process intermediates of the following formula are obtained:

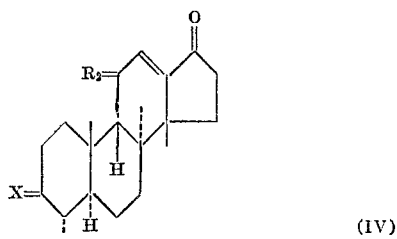

in which X and $R_2$ have the same meaning as stated in connection with Formula II.

By hydrogenating compounds of Formula IV with agents which are capable of hydrogenating the double bond without attacking the keto radicals present, compounds of the follownig formula are obtained:

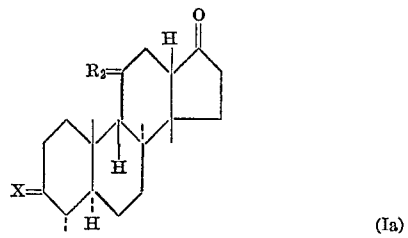

in which X and $R_2$ have the same meaning as hereinbefore stated.

Suitable hydrogenating agents are in particular zinc in acetic acid, and palladium which effects catalytic hydrogenation, but other hydrogenation agents which attack double bonds only are also applicable.

Compounds of Formula Ia are if X is not an α-hydroxy group or an α-acyloxy group within the scope of the invention.

If X has the above meaning in Formula Ia the α-hydroxy group or the α-acyloxy group may in known manner be converted into the corresponding β-oriented hydroxy or acyloxy group.

Compounds of Formula Ia in which $R_2$ is an oxygen atom can, when treated with a strong base, e.g. ethanolic sodium hydroxide, or a strong acid, e.g. hydrogen chloride in acetic acid be epimerized at C–9 whereby compounds of the following formula are obtained:

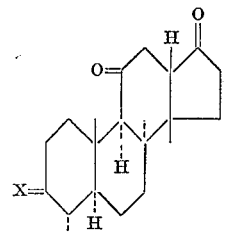

in which X has the meaning hereinbefore defined.

If compounds of Formulae Ia and Ib, in which X stands for an oxygen atom or a β-hydroxy group, are reduced with platinum as a catalyst, or with a complex hydride, e.g. sodium borohydride or lithium aluminuium hydride, 3,11,17-trihydroxy compounds are obtained in which the hydroxy groups attached to C–11 and C–17 are α- or β-oriented, depending on the kind of reducing agent and the reduction conditions as more elaborately described in the literature in connection with similar reactions.

In compounds of Formulae Ia and Ib in which the 3-substituent is a keto radical, the said radical can be protected, e.g. by a ketalization or a cycloketalization whereby, by a reduction as hereinbefore mentioned followed by a hydrolytic cleavage of the ketal, 3-keto-11,17-dihydroxy compounds of the invention are obtained. It is, however, also possible to protect a keto radical both at the C–3 position and the C–17 position in the said manner, and reduction of these compounds followed by a hydrolytic cleavage of the ketal groups results in the formation of 3,17-diketo-11-hydroxy compounds of the invention.

Among hydrocarbon monocarboxylic and dicarboxylic acids the acyl radical of which may form part of the ester groups in the compounds of the invention mentioned may be made of the formic, acetic, propionic, butyric, isobutyric, benzoic, phenylacetic, phenylpropionic, cyclopentyl-propionic, furoic, enanthic, succinic, and glutaric acid without these being considered limiting for the invention.

The esters can be produced by known reactions, e.g. by a compound of Formula I, in which one or more of the terms $R_1$, $R_2$ and $R_3$ stand for a hydroxy group, being reacted with a functionally reactive derivative of the hydrocarbon monocarboxylic or discarboxylic acid in question, e.g. with a halogenide or an anhydride.

In particular, the anhydride is suitable when a hydroxy group at C–11 is to be esterified in which case it may furthermore be appropriate to perform the esterification in the presence of an acid catalyst, such as p-toluenesulphonic acid.

The invention is illustrated but not limited by the following examples.

EXAMPLE 1

3β-hydroxy-4α,8α,14β-trimethyl-18-nor-9β-androst-12-ene-11,17-dione 3-acetate

Ozonized oxygen was bubbled at 75° C. for a period of 5 hours through a solution of 3.19 g. of 3-acetate of 3-epi-24,25-dihydrofusidic acid in 75 ml. of dry methylene chloride containing 0.75 ml. of pyrine, the ozone being introduced in an excess of about ten times the theoretical amount.

3.75 g. of zinc dust and 7.5 ml. of acetic acid were added, and after stirring for 90 minutes at 25° C., the resulting precipitate was filtered off and washed with methylene chloride. The combined filtrate and washings were successively washed with water, aqueous sodium bicarbonate, and water. After drying and evaporation of the solvent in vacuo the residue crystallized from ether to yield 3β,16β - diacetoxy - 4α,8α,14β - trimethyl - 18-nor-9β,13α-androstane-11,17-dione with a melting point of 188–189° C.

2 g. of the above compound was suspended in 40 ml. of ethanol, and 10 ml. of 2 N sodium hydroxide was added. The resulting orange solution was immediately cooled to room temperature, and, after standing for 2 minutes, acidified with 4 N hydrochloric acid. The yellow compound which crystallized by the addition of water was collected, washed with water, and dried to yield the desired compound with a melting point of 170.5–171.5° C., and an U.V.-spectrum with a $$\lambda_{max.}^{EtOH}: 260 \text{ m}\mu \text{ } (\epsilon=8900)$$

EXAMPLE 2

3β-hydroxy-4α,8α,14β-trimethyl-18-nor-9β,13β-androstane-11,17-dione 3-acetate 3.28 g. of the ene-dione of Example 1 was dissolved in 64 ml. of 90% acetic acid. 6.6 g. of zinc dust was added in small portions over 15 minutes, and the solution was simultaneously stirred. After stirring for a further 60 minutes, the resulting precipitate was filtered off, and the filtrate poured into water. The product thereby obtained was filtered off, dried, and extracted with methylene chloride. The extract was washed with water, dried, and evaporated to dryness. The residue was crystallized from ethanol/water, and the desired compound was obtained with a melting point of 200–202° C.

EXAMPLE 3

3β-hydroxy-4α,8α,14β-trimethyl-18-nor-9β,13β-androsta-11,17-dione 1.0 g. of the 3β-acetoxy compound of Example 2 was dissolved in 20 ml. of ethanol. 0.5 ml. of 30% aqueous KOH was added, and the resulting mixture was left to stand at room temperature for 4 hours. 40 ml. of water was added, and most of the ethanol removed in vacuo. The resulting mixture was extracted with ether. The extract was washed with water, dilute hydrochloric acid, and finally with water. After drying the solvent was removed in vacuo to leave 780 mg. of the desired compound in the form of an amorphous powder.

EXAMPLE 4

3β-hydroxy-4α,8α,14β-trimethyl-18-nor-9α,13β-androsta-11,17-dione 400 mg. of the compound described in Example 3 was dissolved in 10 ml. of ethanol. 2 ml. of 30% aqueous KOH was added, and the resulting mixture was refluxed for 24 hours. After cooling, most of the ethanol was removed in vacuo. The residue was partitioned between 20 ml. of water and 30 ml. of ether. The ether phase was separated, washed with dilute hydrochloric acid followed by water, dried, and evaporated to leave 370 mg. of the desired compound in the form of an amorphous powder.

EXAMPLE 5

3β-hydroxy-4α,8α,14β-trimethyl-18-nor-9α,13β-androsta-11,17-dione 3-benzoate 200 mg. of the compound described in Example 4 was dissolved in 5 ml. of pyridine. 200 mg. of benzoylchloride was added and the resulting mixture was left to stand at room temperature for 16 hours. 20 ml. of water was added, and the resulting mixture was extracted with ether. The ethereal extract was successively washed with dilute hydrochloric acid, aqueous NaHCO₃, and water. After drying the solvent was removed in vacuo to leave 210 ml. of the desired compound in the form of an amorphous powder.

EXAMPLE 6

3β,11α,17β-trihydroxy-4α,8α,14β-trimethyl-18-nor-9β,13β-androstane 3-acetate

To a stirred solution of 12.9 g. of the diketone of Example 2 in 350 ml. of methyl "Cellosolve," ("Cellosolve" is a Registered Trademark) 1.29 g. of sodium borohydride was added in small portions over 30 minutes, the temperature being kept below 25° C. by cooling. After standing at room temperature for 1 hour, the mixture was neutralized with acetic acid, and poured into water. The precipitate which formed was filtered off, and extracted with ether. The extract was carefully washed with water and dried. The ethereal solution was concentrated whereby the desired compound separated. The melting point of the dried substance was 191–192° C.

EXAMPLE 7

3β,11α,17β-trihydroxy-4α,8α,14β-trimethyl-18-nor-9β,13β-androstane 3-phenylacetate To a solution of 336 mg. of the compound described in Example 6 in 3 ml. of pyridine 160 mg. of phenylacetylchloride was added. After standing for 16 hours at room temperature water was added, and the amorphous precipitate thereby obtained was collected, washed with water, and dried to yield 415 mg. of the desired compound.

EXAMPLE 8

11α,17α-dihydroxy-4α,8α,14β-trimethyl-18-nor-9β,13β-androstane-3-one

To a stirred solution of 3.28 g. of 4α,8α,14β-trimethyl-18-nor-9β-androst-12-ene-3,11,17-trione in 94 ml. of 90% acetic acid, 6.6 g. of zinc dust was added in small portions. The further procedure was performed as described in Example 2 whereafter 4α,8α,14β-trimethyl-18-nor-9β,13β-androstane-3,11,17-trione was obtained with a melting point of 172–174° C.

This compound was converted into its 3-ethylene ketal which thereafter was reduced as described in Example 6, whereby the 3-ethylene ketal of 11α,17α-dihydroxy-4α,8α,14β - trimethyl-18-nor-9β,13β-androstane-3-one was isolated with a melting point of 183–185° C. By heating this 3-ethylene ketal on a steam bath with a mixture of methanol and 4 N hydrochloric acid for 20 minutes, followed by cooling and addition of water, the desired compound was obtained as a colourless amorphous powder.

EXAMPLE 9

11α,17α-dihydroxy-4α,8α,14β-trimethyl-18-nor-9β,13β-androstane-3-one 17-hemisuccinate A solution of 334 mg. of the compound described in Example 8 and 110 mg. of succinic anhydride in 10 ml. of dry acetone was refluxed for 12 hours. After cooling, the solvent was removed in vacuo and the residue taken up in ether. The ethereal solution was extracted with aqueous ammonia. The aqueous phase was separated, acidified to pH 2.0, and extracted with ether. The extract was washed with water, dried, and evaporated in vacuo to leave the desired compound in the form of a colourless amorphous powder.

EXAMPLE 10

11α,17α-dihydroxy-4α,8α,14β-trimethyl-18-nor-9β,13β-androstane-3-one- 17-isobutyrate To a solution of 334 mg. of the compound described in Example 8 in 3 ml. of pyridine 115 mg. of isobutyrylchloride was added. After standing for 16 hours at room temperature water was added, and the amorphous precipitate thereby obtained was collected, washed with water, and dried to yield the desired compound as a colourless amorphous powder.

EXAMPLE 11

11α,17β-dihydroxy-4α,8α,14β-trimethyl-18-nor-9β,13β-androstane-3-one

By further concentration of the mother liquor from the preparation of the 3-ethylene ketal mentioned in Example 8, a crystalline material was obtained which after several recrystallizations from ether gave the pure 3-ethylene ketal of 11α,17β-dihydroxy-4α,8α,14β-trimethyl-18-nor-9β,13β-androstane-3-one. By treating this 3-ethylene ketal according to the method described in Example 8, the desired compound was obtained in the form of a colourless amorphous powder.

EXAMPLE 12

11α,17β-dihydroxy-4α,8α,14β-trimethyl-18-nor-9β,13β-androstane-3-one 11,17-diacetate 760 mg. of the compound described in Example 11 was dissolved in 7.6 ml. of a mixture of 40 ml. of acetic acid, 20 ml. of acetic anhydride, and 10 g. of p-toluenesulfonic acid. After standing for 40 minutes water was added, and the oily precipitate which formed, was extracted with ether. The ethereal solution was washed with aqueous $NaHCO_3$, followed by water, dried, and evaporated in vacuo to leave the desired compound in the form of a colourless amorphous powder.

EXAMPLE 13

4α,8α,14β-trimethyl-18-nor-9α,13β-androstane-3,11,17-trione 1 g. of the intermediate of Example 8, namely 4α,8α,14β - trimethyl - 18 - nor - 9β,13β-androstane-3,11,17-trione (was dissolved in a mixture of 20 ml. of acetic acid and 2 ml. of concentrated hydrochloric acid. After standing at room temperature for seven days, water was added to presipitate the desired compound. Recrystallization from ethanol/water gave the pure substance with a melting point of 244–248° C.

We claim:
1. 11α,17α-dihydroxy-4α,8α,14β - trimethyl - 18 - nor-9β,13β-androstane-3-one.
2. 11α,17α - dihydroxy - 4α,8α,14β - trimethyl - 18-nor - 9β,13β - androstane - 3 - one 17 - succinate.
3. 11α,17α - dihydroxy - 4α,8α,14β - trimethyl - 18-nor - 9β,13β-androstane - 3 - one 17 - isobutyrate.
4. 11α,17β - dihydroxy - 4α,8α,14β - trimethyl - 18-nor - 9β,13β-androstane - 3 - one.
5. 11α,17β - dihydroxy - 4α,8α,14β - trimethyl - 18-nor - 9β,13β - androstane - 3 - one 11,17 - diacetate.
6. 11α,17x - dihydroxy - 4α,8α,14β - trimethyl - 18-nor - 9β,13β - androstane - 3 - one 17 - esters with acids selected from the group consisting of formic, acetic, propionic, butyric, isobutyric, benzoic, phenylacetic, phenylpropionic, cyclopentyl - propionic, furoic, enanthic, succinic and glutaric acid, x being selected from the group consisting of α and β.

References Cited

UNITED STATES PATENTS

| | | | |
|---|---|---|---|
| 3,274,219 | 9/1966 | Krakower | 260—397.45 |
| 3,364,237 | 1/1968 | Diassi et al. | 260—397.3 |

OTHER REFERENCES

Bucourt et al. Comptes Rendus Hebdomadaires des Seances de L'acadamine des Sciences (1964) April. Pages 3491–3494 relied on.

ELBERT L. ROBERTS, Primary Examiner

U.S. Cl. X.R.

260—397.1, 397.3, 397.5, 999